(12) United States Patent
Wu

(10) Patent No.: US 9,871,390 B2
(45) Date of Patent: Jan. 16, 2018

(54) BATTERY PROTECTION INTEGRATED CIRCUIT APPLIED TO BATTERY CHARGING/DISCHARGING SYSTEM AND METHOD FOR DETERMINING RESISTANCES OF VOLTAGE DIVIDER OF BATTERY PROTECTION INTEGRATED CIRCUIT

(71) Applicant: Silergy Corp., Grand Cayman (KY)

(72) Inventor: Chien-Han Wu, Nantou County (TW)

(73) Assignee: Silergy Corp., Cayman Islands (KY)

(*) Notice: Subject to any disclaimer, the term of this patent is extended or adjusted under 35 U.S.C. 154(b) by 619 days.

(21) Appl. No.: 14/474,320

(22) Filed: Sep. 2, 2014

(65) Prior Publication Data

US 2016/0064974 A1    Mar. 3, 2016

(51) Int. Cl.
*H01H 85/02* (2006.01)
*H02J 7/00* (2006.01)

(52) U.S. Cl.
CPC ....... *H02J 7/0031* (2013.01); *H02J 2007/004* (2013.01); *H02J 2007/0037* (2013.01)

(58) Field of Classification Search
CPC ............. H02J 7/0031; H02J 2007/0037; H02J 2007/004
USPC ......................................... 307/130
See application file for complete search history.

(56) References Cited

U.S. PATENT DOCUMENTS

| | | | | | |
|---|---|---|---|---|---|
| 3,911,349 | A | * | 10/1975 | Seeley | H02J 7/0086 320/143 |
| 6,636,020 | B1 | * | 10/2003 | Ronald | H02J 7/0031 320/128 |
| 7,609,049 | B1 | * | 10/2009 | Tian | G01R 19/16542 324/522 |
| 7,638,977 | B2 | * | 12/2009 | Park | H01M 10/482 320/134 |
| 8,581,657 | B2 | * | 11/2013 | Itoh | G05F 1/56 327/525 |
| 2004/0066683 | A1 | * | 4/2004 | Hartmann | G11C 29/02 365/200 |
| 2005/0052159 | A1 | * | 3/2005 | Moore | H02J 7/0031 320/134 |
| 2005/0073023 | A1 | * | 4/2005 | Fifield | H01L 23/5252 257/530 |
| 2006/0139008 | A1 | * | 6/2006 | Park | H01M 10/482 320/134 |
| 2008/0067953 | A1 | * | 3/2008 | Kranz | H05B 33/0815 315/291 |

(Continued)

*Primary Examiner* — Zeev V Kitov
*Assistant Examiner* — Brian K Baxter

(57) ABSTRACT

A battery protection IC applied to a battery charging system is provided, where the battery charging system includes a charger and a switch, the switch is coupled between the charger and a battery when the battery is put into the battery charging system, and the battery protection IC includes a voltage divider, a comparator and a controller. The voltage divider is coupled to a first node of the switch, and is utilized for dividing a voltage of the first node to generate a divided voltage, whereat least one resistor of the voltage divider is formed by two different types of fuses. The comparator is utilized for comparing the voltage with a reference voltage to generate a comparison result. The controller is utilized for generating a control signal according to the comparison result, where the control signal is utilized for switching on or switching off the switch.

5 Claims, 4 Drawing Sheets

(56) References Cited

U.S. PATENT DOCUMENTS

| | | | |
|---|---|---|---|
| 2008/0068047 A1* | 3/2008 | Hashimoto | H01L 23/5258 327/88 |
| 2008/0224664 A1* | 9/2008 | Sano | H02J 7/0031 320/134 |
| 2008/0231249 A1* | 9/2008 | Barrow | G05F 3/262 323/315 |
| 2009/0315515 A1* | 12/2009 | Yu | H02J 7/0016 320/116 |
| 2013/0193939 A1* | 8/2013 | Sakaguchi | H02H 9/02 323/277 |

* cited by examiner

ABATTERY PROTECTION INTEGRATED CIRCUIT APPLIED TO BATTERY CHARGING/DISCHARGING SYSTEM AND METHOD FOR DETERMINING RESISTANCES OF VOLTAGE DIVIDER OF BATTERY PROTECTION INTEGRATED CIRCUIT

BACKGROUND OF THE INVENTION

1. Field of the Invention

The present invention relates to a battery protection integrated circuit, and more particularly, to a battery protection integrated circuit that can precisely detect a voltage of a battery and protect the battery from being overcharged or over-discharged.

2. Description of the Prior Art

When a battery is charged or discharged, a battery protection integrated circuit (IC) is used to detect a voltage of the battery and to prevent the battery from being overcharged or over-discharged. In detail, the battery protection IC has a voltage divider and a comparator, the voltage divider divides a current voltage of the battery to generate a divided voltage, and the comparator compares the divided voltage with a predetermined voltage to generate a comparison result, where the comparison result is used to indicate whether the battery approaches an overcharge or over-discharge threshold. When the comparison result indicates that the battery approaches the overcharge or over-discharge threshold, the battery protection IC stops charging or discharging the battery to prevent the battery from being damaged.

However, when the voltage divider is not accurate (i.e., resistances of the resistors of the voltage divider may have error), the divided voltage and the comparison result may not represent the state (voltage) of the battery correctly. Therefore, the battery may be overcharged or over-discharged due to the inaccurate voltage divider, causing the battery damaged.

SUMMARY OF THE INVENTION

It is therefore an objective of the present invention to provide a battery protection IC, which has an accurate voltage divider, to solve the above-mentioned problem.

According to one embodiment of the present invention, a battery protection integrated circuit applied to a battery charging system is provided, wherein the battery charging system comprises a charger and a switch, the switch is coupled between the charger and a battery when the battery is put into the battery charging system, the switch is utilized for selectively coupling the charger to the battery, and the battery protection integrated circuit comprises a voltage divider, a comparator and a controller. The voltage divider is coupled to a first node of the switch, and is utilized for dividing a voltage of the first node of the switch to generate a divided voltage, where a resistor of the voltage divider are formed by at least a first fuse resistor and a second fuse resistor, the first fuse resistor is one of a laser fuse, an electrical fuse and an anti-fuse, and the second fuse resistor is another one of the laser fuse, electrical fuse and anti-fuse. The comparator is coupled to the voltage divider, and is utilized for comparing the voltage of the first node of the switch with a reference voltage to generate a comparison result. The controller is coupled to the comparator, and is utilized for generating a control signal according to the comparison result, where the control signal is utilized for switching on or switching off the switch.

According to another embodiment of the present invention, a battery protection integrated circuit applied to a battery discharging system is provided, where the battery discharging system comprises a load and a switch, the load is connected to a battery when the battery is put into the battery discharging system, the switch is utilized for selectively allowing the battery to discharge, and the battery protection integrated circuit comprises a voltage divider, a comparator and a controller. The voltage divider is coupled to a first node of the switch, and is utilized for dividing a voltage of the first node of the switch to generate a divided voltage, wherein a resistor of the voltage divider are formed by at least a first fuse resistor and a second fuse resistor, the first fuse resistor is one of a laser fuse, an electrical fuse and an anti-fuse, and the second fuse resistor is another one of the laser fuse, electrical fuse and anti-fuse. The comparator is coupled to the voltage divider, and is utilized for comparing the voltage of the first node of the switch with a reference voltage to generate a comparison result. The controller is coupled to the comparator, and is utilized for generating a control signal according to the comparison result, where the control signal is utilized for switching on or switching off the switch.

According to another embodiment of the present invention, a method for determining resistances of a voltage divider of a battery protection integrated circuit comprises: performing a first fuse trimming operation upon the resistors of the voltage divider; determining whether the resistances of the resistors of the voltage divider satisfy a rule; and when the resistances of the voltage divider do not satisfy the rule, performing a second fuse trimming operation upon the resistors of the voltage divider, where the first fuse trimming operation is one of a laser fuse trimming operation, an electrical fuse trimming operation and a anti-fuse trimming operation, and the second fuse trimming operation is another one of the laser fuse trimming operation, electrical fuse trimming operation and anti-fuse trimming operation.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising"

are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
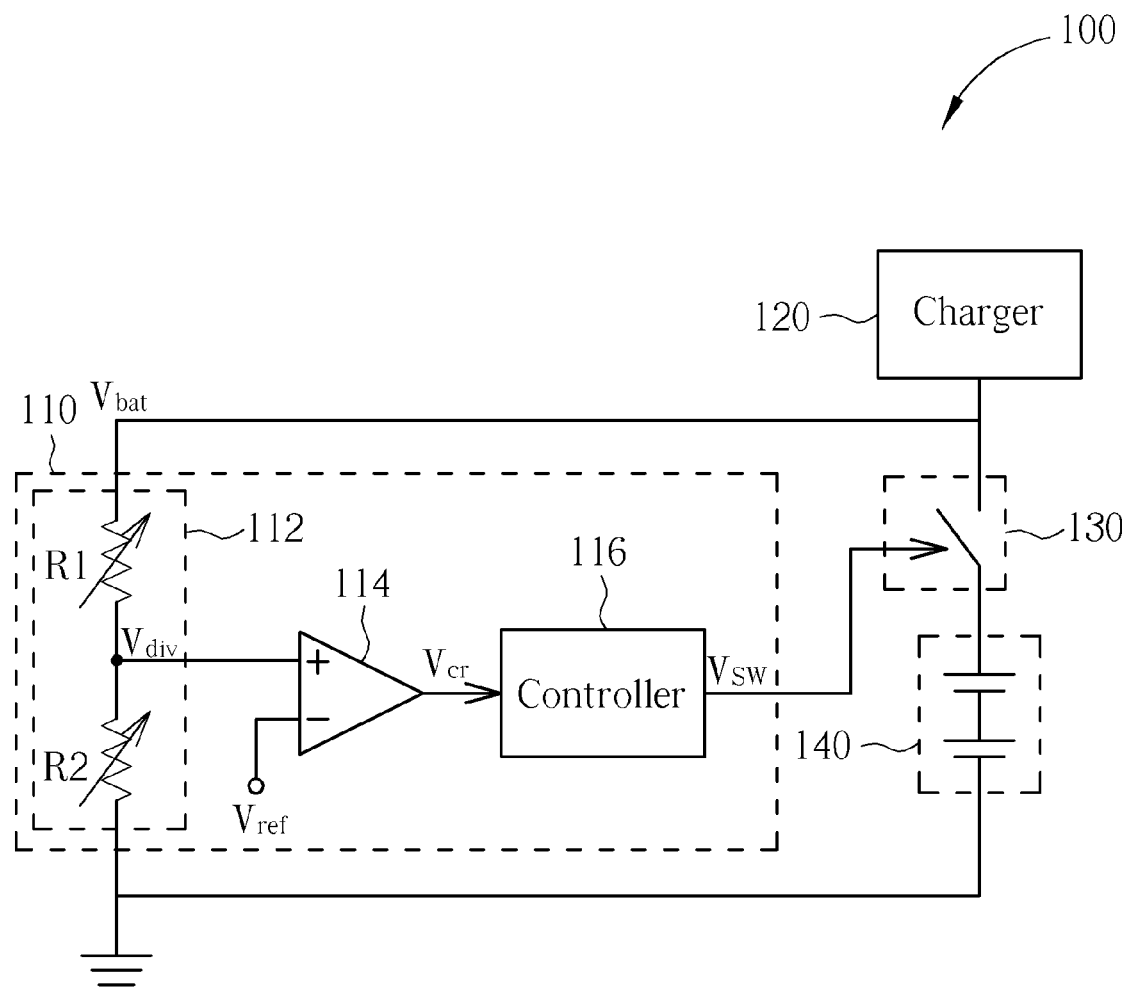
FIG. 1 is a diagram illustrating a battery charging system according to one embodiment of the present invention.

Please refer to FIG. 1, which illustrates a battery charging system 100 according to one embodiment of the present invention. Referring to FIG. 1, the battery charging system 100 includes a battery protection IC 110, a charger 120, a switch 130, where the battery protection IC 110 includes a voltage divider 112 including two resistors R1 and R2, a comparator 114 and a controller 116. In this embodiment, at least one of the resistors R1 and R2 is formed by at least a first fuse resistor and a second fuse resistor, where the first fuse resistor is one of a laser fuse, an electrical fuse and an anti-fuse, and the second fuse resistor is another one of the laser fuse, electrical fuse and anti-fuse.

Figure 2:
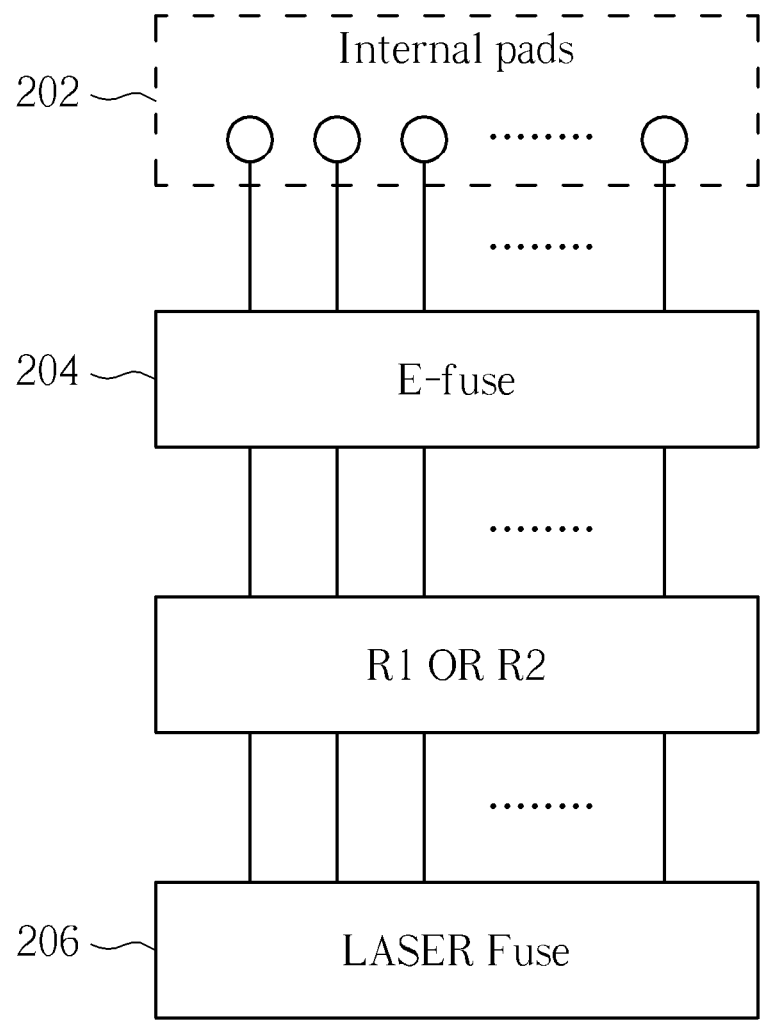
FIG. 2 is a diagram showing that the resistor is formed by the electrical fuse and the laser fuse.

FIG. 2 is a diagram showing that the resistor R1 or R1 is formed by the laser fuse and the electrical fuse. As shown in FIG. 2, the resistance of the resistor R1 or R2 is determined by the laser fuse 206 and the electrical fuse 204. The laser fuse 206 means that one or more fuses are cut by a laser trimming operation to have a required resistance, and the electrical fuse 204 means that one or more fuses are cut by inputting an over-current from the internal pads 202 to have a required resistance. Because the functions of the laser fuse 206 and the electrical fuse 204 should be known by a person skilled in this art, further descriptions are therefore omitted here.

Figure 3:
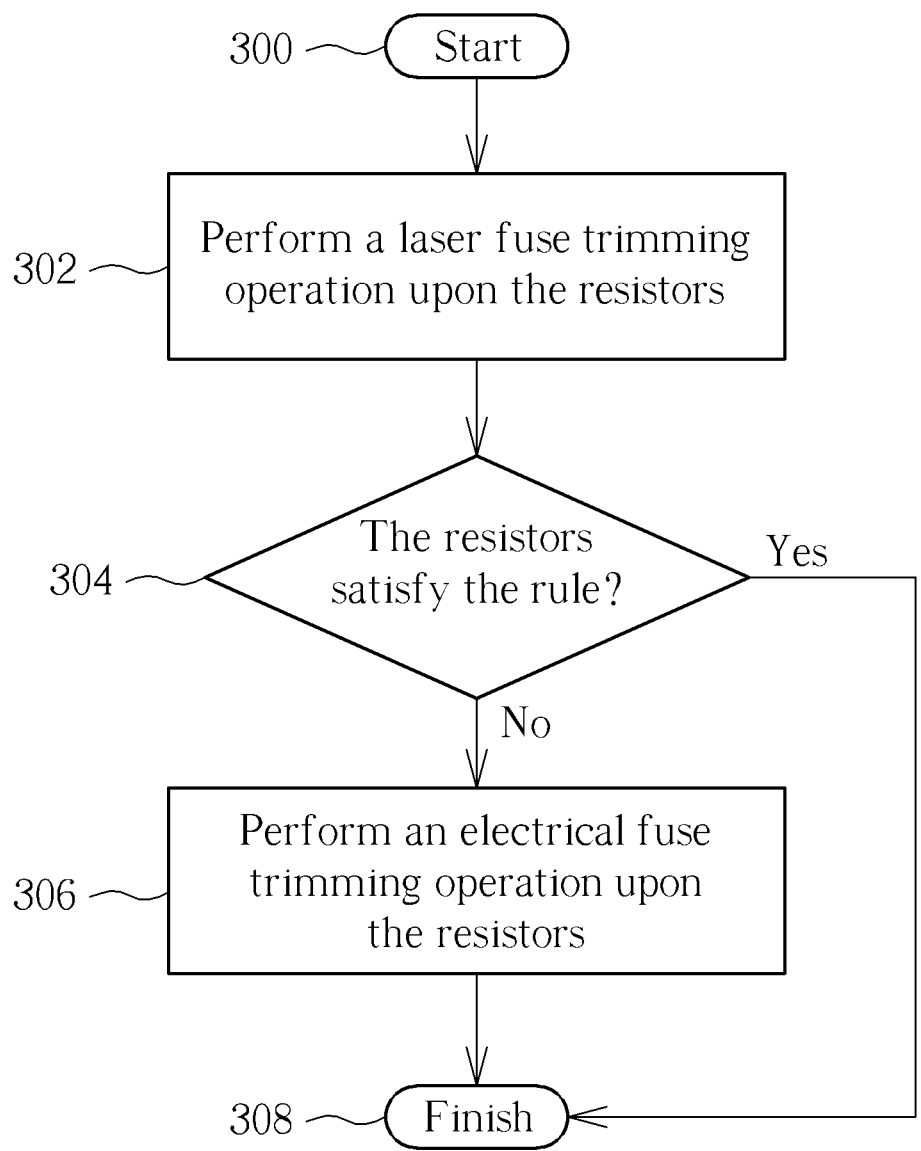
FIG. 3 is a flowchart of a method for determining resistances of resistors of a voltage divider of a battery protection IC according to one embodiment of the present invention.

Please refer to FIGS. 1-3 together, FIG. 3 is a flowchart of a method for determining resistances of the resistors R1 and R2 of the voltage divider 112 of the battery protection IC 110 according to one embodiment of the present invention. Referring to FIG. 3, the flow is described as follows:

In Step 300, the flow starts. In Step 302, a laser fuse trimming operation is performed upon the resistors R1 and R2 of the voltage divider 112. In Step 304, it is determined whether the resistances of the resistors R1 and R2 of the voltage divider 112 satisfy a rule (i.e., determining whether the resistances of the resistors R1 and R2 are accurate). For example, assuming that the charge threshold of the battery is 4.2V, an engineer can input a test voltage (4.2V±20 mV) into the voltage divider 112 to determine whether the switch 130 is switched off or not. If the switch 130 is switched off, it is meant that the resistances of the resistors R1 and R2 are accurate; and if the switch 130 is still switched on, it is meant that the resistances of the resistors R1 and R2 are not accurate. In this embodiment, if the switch 130 is still switched on when the engineer inputs the test voltage (4.2V±20 mV), the engineer can input other test voltages into the voltage divider 112 to determine a minimum test voltage higher than (4.2V+20 mV) or a maximum test voltage lower than (4.2V-20 mV) that can make the switch 130 switched off.

When it is determined that the resistors R1 and R2 of the voltage divider 112 satisfy the rule, the flow enters Step 308 to finish the flow; and when it is determined that the resistors R1 and R2 of the voltage divider 112 do not satisfy the rule, the flow enters Step 306. In Step 306, an electrical fuse trimming operation is performed upon the resistors R1 and R2 of the voltage divider 112 by referring to a look-up table to adjust the resistances of the resistors R1 and R2, where the look-up table here records minimum/maximum test voltages that can switch off the switch 130 and their corresponding electrical fuse trimming operations. Then, the flow enters Step 308 to finish the flow.

It is noted that although the embodiment shown in FIG. 2 and FIG. 3 shows the resistors R1 and R2 are formed by the laser fuse and the electrical fuse, it is not meant to be a limitation of the present invention. In other embodiments of the present invention, the resistors R1 and R2 can be formed by any two of the laser fuse, electrical fuse and anti-fuse. These alternative designs should fall within the scope of the present invention.

After the resistances of the resistors of the voltage divider 112 is precisely adjusted, the battery charging system 100 can be operated correctly. In the operations of the battery charging system 100, at the beginning, the switch 130 is switched on, a battery 140 is put into the battery charging system 100, and the charger 120 starts to charge the battery 140. Then, the voltage divider 112 divides the current voltage $V_{bat}$ of the battery 140 to generate a divided voltage $V_{div}$, and the comparator 114 compares the divided voltage $V_{div}$ with a reference voltage $V_{ref}$ to generate a comparison result $V_{cr}$, where the comparison result $V_{cr}$ is used to indicate whether the battery 140 approaches an overcharge threshold. Then, the controller 116 receives the comparison result $V_{cr}$, and generates a control signal $V_{SW}$ according to the comparison result $V_{cr}$, where the control signal $V_{SW}$ is used to switch on or switch off the switch 130. In detail, when the divided voltage $V_{div}$ is greater than the reference voltage $V_{ref}$, it is meant that the voltage $V_{bat}$ approaches the overcharge threshold (in this embodiment, "approach the overcharge threshold" can be determined by detect whether the voltage $V_{bat}$ is greater than 4.2 volts), and the controller 116 generates the control signal $V_{SW}$ to switch off the switch 130 to prevent the battery 140 from being charged by the charger 120. On the other hand, when the divided voltage $V_{div}$ is not greater than the reference voltage $V_{ref}$, it is meant that the voltage $V_{bat}$ does not approach the overcharge threshold (in the safe region), and switch 130 is switched on to make the charger 120 continue charging the battery 140.

Figure 4:
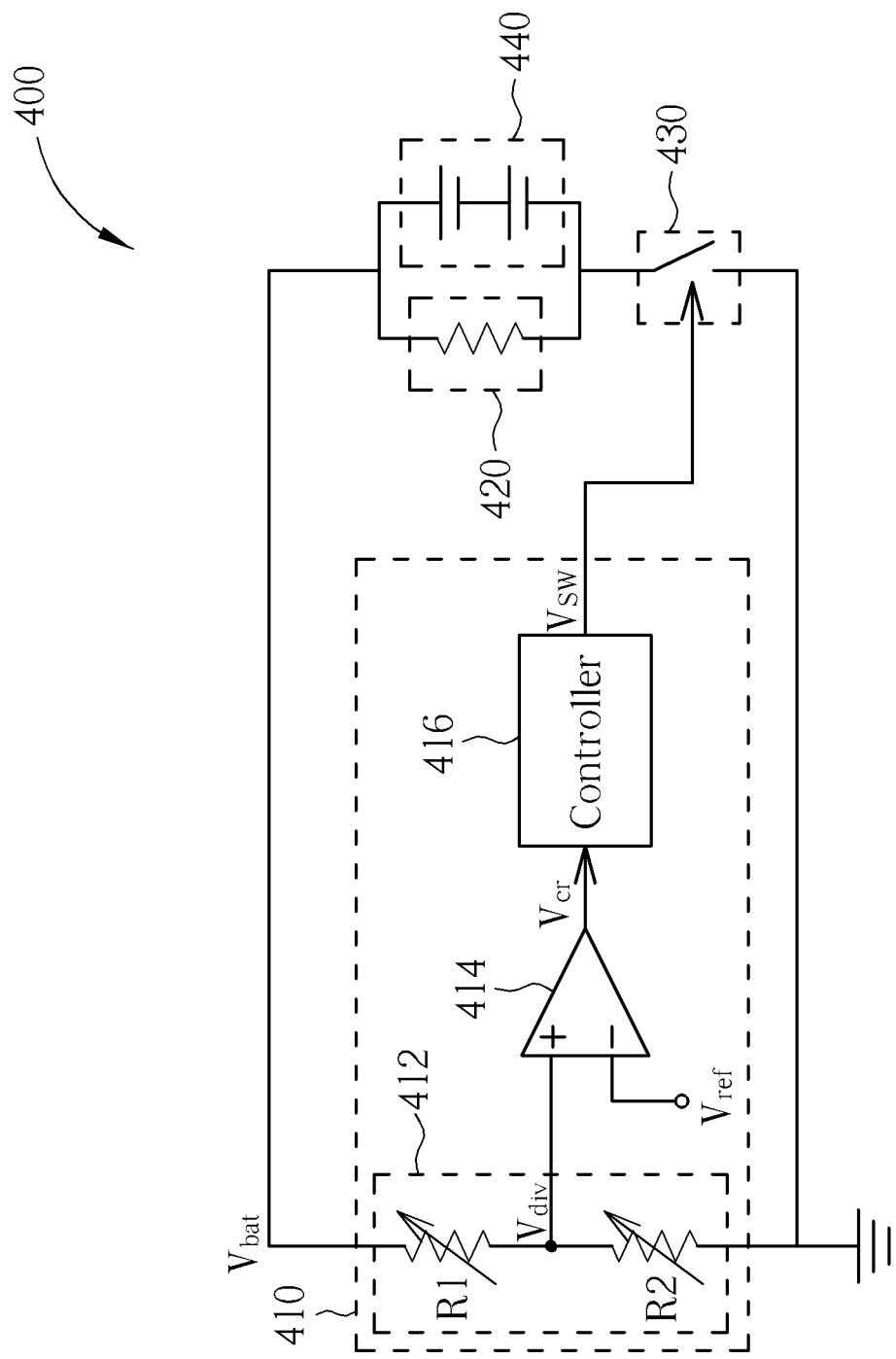
FIG. 4 is a diagram illustrating a battery discharging system according to one embodiment of the present invention.

Please refer to FIG. 4, which illustrates a battery discharging system 400 according to one embodiment of the present invention. Referring to FIG. 4, the battery discharging system 4100 includes a battery protection IC 410, a load 420, a switch 430, where the battery protection IC 410 includes a voltage divider 412 including two resistors R1 and R2, a comparator 414 and a controller 416. In this embodiment, at least one of the resistors R1 and R2 is formed by at least a first fuse resistor and a second fuse resistor, where the first fuse resistor is one of a laser fuse, an electrical fuse and an anti-fuse, and the second fuse resistor is another one of the laser fuse, electrical fuse and anti-fuse.

Furthermore, the determination of the resistances of the resistors R1 and R2 of the voltage divider 412 is the same as the determination of that of the voltage divider 112 shown in FIG. 1. That is, the determination of the resistances of the resistors R1 and R2 of the voltage divider 412 can refer to FIG. 2 and FIG. 3 and above-mentioned disclosure.

In the operations of the battery discharging system 400, at the beginning, the switch 430 is switched on, a battery 440 is put into the battery discharging system 400, and battery 440 begins to be discharged. Then, the voltage divider 412 divides the current voltage $V_{bat}$ of the battery 440 to generate a divided voltage $V_{div}$, and the comparator 414 compares the divided voltage $V_{div}$ with a reference voltage $V_{ref}$ to generate a comparison result $V_{cr}$, where the comparison result $V_{cr}$ is used to indicate whether the battery 440 approaches an over-discharge threshold. Then, the controller 416 receives the comparison result $V_{cr}$, and generates a control signal $V_{SW}$ according to the comparison result $V_{cr}$, where the control signal $V_{SW}$ is used to switch on or switch off the switch 430. In detail, when the divided voltage $V_{div}$ is greater than the reference voltage $V_{ref}$, it is meant that the voltage $V_{bat}$ does not approach the over-discharge threshold (in this embodiment, "approach the over-discharge threshold" can be determined by detect whether the voltage $V_{bat}$ is lower than 3.8 volts), and the controller 416 generates the control signal $V_{SW}$ to switch on the switch 430 to continue discharge the battery 440. On the other hand, when the divided voltage $V_{div}$ is not greater than the reference voltage $V_{ref}$, it is meant that the voltage $V_{bat}$ approaches the over-discharge threshold, and the controller 416 generates the control signal $V_{SW}$ to switch off the switch 430 to prevent the battery from being over-discharged.

Briefly summarized, in the battery protection IC of the present invention, at least one of the resistors of the voltage divider is formed by two different types of fuses. Therefore, the resistances of the resistors of the voltage divider can be determined accurately, and the battery protection IC can function well.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A battery protection integrated circuit applied to a battery charging system, wherein the battery charging system comprises a charger and a switch, the switch is coupled between the charger and a battery when the battery is put into the battery charging system, the switch is utilized for selectively coupling the charger to the battery, and the battery protection integrated circuit comprises:
    a voltage divider, coupled to a first node of the switch, for dividing a voltage of the first node of the switch to generate a divided voltage, wherein the voltage divider comprises a first fuse resistor and a second fuse resistor, the first fuse resistor is a laser fuse, and the second fuse resistor is an electrical fuse, and wherein a fuse trimming operation is performed upon the first and second fuse resistors to make the resistances meet a charge threshold requirement of the battery;
    a comparator, coupled to the voltage divider, for comparing the voltage of the first node of the switch with a reference voltage to generate a comparison result; and
    a controller, coupled to the comparator, for generating a control signal according to the comparison result, wherein the control signal is utilized for switching on or switching off the switch.

2. The battery protection integrated circuit of claim 1, wherein when the comparison result represents that the voltage of the first node of the switch is greater than 4.2 volts, the controller generates the control signal which is utilized to switch off the switch.

3. A battery protection integrated circuit applied to a battery discharging system, wherein the battery discharging system comprises a load and a switch, the load is connected to a battery when the battery is put into the battery discharging system, the switch is utilized for selectively allowing the battery to discharge, and the battery protection integrated circuit comprises:
    a voltage divider, coupled to a first node of the switch, for dividing a voltage of the first node of the switch to generate a divided voltage, wherein the voltage divider comprises a first fuse resistor and a second fuse resistor, the first fuse resistor is a laser fuse, and the second fuse resistor is an electrical fuse, and wherein a fuse trimming operation is performed upon the first and second fuse resistors to make the resistances meet a discharge threshold requirement of the battery;
    a comparator, coupled to the voltage divider, for comparing the voltage of the first node of the switch with a reference voltage to generate a comparison result; and
    a controller, coupled to the comparator, for generating a control signal according to the comparison result, wherein the control signal is utilized for switching on or switching off the switch.

4. A method for determining resistances of a voltage divider of a battery protection integrated circuit, comprising:
    performing a first fuse trimming operation upon the resistors of the voltage divider;
    determining whether the resistances of the resistors of the voltage divider satisfy a rule; and
    when the resistances of the voltage divider do not satisfy the rule after the first fuse trimming operation, performing a second fuse trimming operation upon the resistors of the voltage divider;
    wherein the first fuse trimming operation is a laser fuse trimming operation, and the second fuse trimming operation is an electrical fuse trimming operation.

5. The method of claim 4, wherein the step of performing the second fuse trimming operation upon the resistors of the voltage divider comprises performing the second fuse trimming operation upon the resistors of the voltage divider by referring to a look-up table.

* * * * *